United States Patent [19]
Schott et al.

[11] 3,934,677
[45] Jan. 27, 1976

[54] MAGNET FOR GUIDING LUBRICATING HEAD ON A CHAIN TO BE LUBRICATED

[76] Inventors: Roger A. Schott, 13559 Rutland, Detroit, Mich. 48227; Lawrence A. Schott, 15940 Warwick, Detroit, Mich. 48223

[22] Filed: June 6, 1974

[21] Appl. No.: 477,311

[52] U.S. Cl. ............................................. 184/15 R
[51] Int. Cl.² .......................................... F16N 7/00
[58] Field of Search ........ 184/15 R, 15 A, 15 B, 14, 184/39, 50 A, 17, 16; 74/230, 257; 124/41; 239/11 D

[56] References Cited
UNITED STATES PATENTS

| 476,253 | 6/1892 | Curtis et al. ........................ 184/17 |
| 1,073,093 | 9/1913 | Coddington .................... 184/50 A |
| 2,627,260 | 2/1953 | Zimmerman .................. 124/41 UX |
| 2,951,557 | 9/1960 | Jung ................................ 184/16 X |
| 3,430,731 | 3/1969 | Satzinger ............................ 184/39 |

Primary Examiner—Richard C. Pinkham
Assistant Examiner—William R. Browne
Attorney, Agent, or Firm—Barnes, Kisselle, Raisch & Choate

[57] ABSTRACT

A chain lubricating device having a vessel with lubricating oil therein connected by a conduit to an applicator head with passages therein for discharging lubricating oil adjacent the links of the chain. The applicator head is retained on the chain for sliding movement relative thereto by a permanent magnet carried by the head. The magnet attacks the links of the chain and thus the head is held to the chain during the lubricating operation.

8 Claims, 5 Drawing Figures

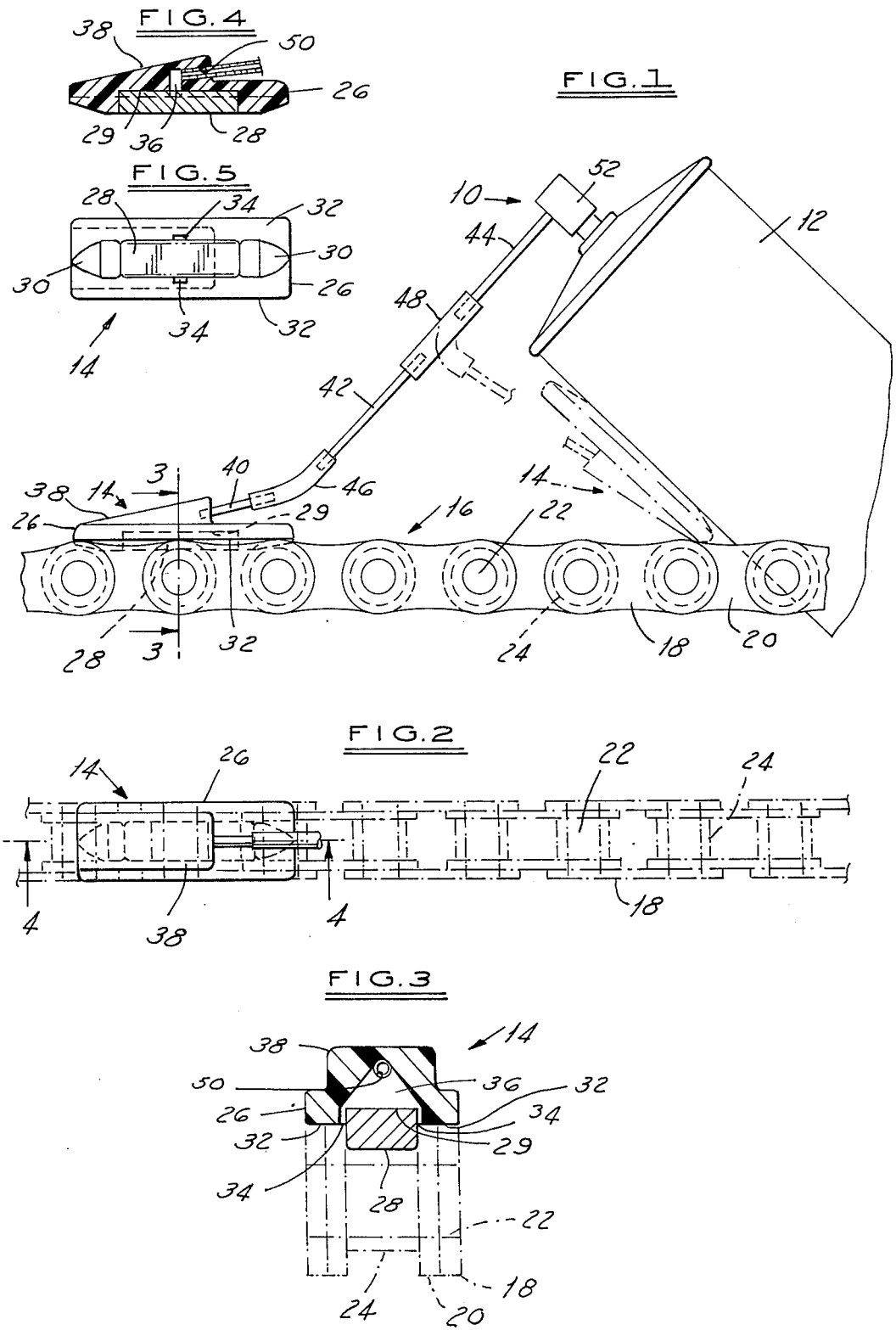

MAGNET FOR GUIDING LUBRICATING HEAD ON A CHAIN TO BE LUBRICATED

This invention relates to a lubricating device and more particularly to a device for lubricating a chain, especially a roller chain of the type commonly used for driving the tractive wheel of bicycles and motorcycles.

A roller type chain is normally lubricated with an oil can which results in considerable waste of lubricating oil, inadequate lubrication of some rollers and joints of the chain, and failure to flush old lubricating oil and particulate contaminants from the rollers and joints of the chain.

Objects of this invention are to provide a roller chain lubricator which decreases the amount of oil wasted in lubricating a roller chain, adequately lubricates all of the roller joints of the chain, flushes old oil and particulate contaminants from the rollers and joints of the chain, may be readily used by unskilled persons and is of simplified design and economical manufacture and assembly.

These and other objects, features and advantages of this invention will be apparent from the following description, appended claims and accompanying drawing, the various views of which may be briefly described as:

FIG. 1, a fragmentary side view of a lubricator device embodying this invention positioned to apply a lubricant to a roller chain;

FIG. 2, a fragmentary top view of the lubricator device and roller chain of FIG. 1;

FIG. 3, a sectional view on line 3—3 of FIG. 2;

FIG. 4, a longitudinal sectional view on line 4—4 of FIG. 2 of the applicator head of the lubricator device; and FIG. 5, a bottom view of the applicator head of the lubricator device.

Referring in more detail to the drawing, FIG. 1 illustrates a lubricator device 10 embodying this invention with a pressurized vessel 12 with a gaseous propellant and a lubricating oil therein connected by a conduit 13 to an applicator head 14 positioned to apply the lubricating oil to a roller chain 16 of the type commonly used to drive the tractive wheel of a bicycle or motorcycle. Chain 16 is made of steel and has a plurality of links 18 and 20 pivotally interconnected adjacent their ends by pins 22 on which roller sleeves 24 are freely received for rotation on the pins.

Applicator head 14 has an elongate body 26 which extends longitudinally approximately two links of chain 16 and has a transverse width substantially equal to the width of the chain. Applicator head 14 is releasably retained for sliding engagement with chain 16 by an elongate generally rectangular-shaped permanent magnet 28 received in a pocket 29 in the lower face of body 26 and secured therein by a suitable adhesive. Applicator head 14 is retained in longitudinal alignment with chain 16 by guides 30 and magnet 28 which project downwardly from body 26 and in cooperation therewith define shoulders 32 thereon. As shown in FIG. 3, when applicator head 14 is received on chain 16, shoulders 32 of the body thereof bear on the edges of the links of the chain and both magnet 28 and guides 30 project between and lie closely adjacent links 18 of the chain to align the applicator head longitudinally thereon.

Lubricating oil is discharged from applicator head 14 immediately adjacent the links of the chain through transversely spaced passageways 34 (FIGS. 3 and 5) formed in applicator head 14 by cooperation of magnet 28 with an overlying blind pocket 36 in a pilot housing 38 of body 26 of the applicator head. Lubricating oil from pressure vessel 12 is supplied to applicator head 14 through conduit 13 which has three rigid tubes 40, 42 and 44 interconnected by flexible hoses 46 and 48. The free end of tube 40 is press fit in a passageway 50 in pilot housing 38 which communicates with passageways 34 via pocket 36 and the free end of tube 44 is connected to the outlet of a control valve 52 mounted on the upper end of pressure vessel 12. Preferably, an atomizer is incorporated with valve 52 so that the lubricating oil is discharged from applicator head 14 as a foam or froth of oil. The positioning of applicator head 14 on chain 16 is facilitated by flexible hoses 46 and 48. As indicated in phantom in FIG. 1, flexible hose 48 also permits applicator head 14 to swing downward to be retained by magnet 28 in engagement with the side of pressure vessel 12, which is of a ferromagnetic material, such as steel, thereby keeping the applicator head free of dust and dirt and providing a compact lubricator device 10 for storing, packaging and shipping.

In using lubricator device 10, applicator head 14 is manually positioned on chain 16 in longitudinal alignment therewith with guides 30 and magnet 28 received between the links of the chain. Lubricating oil is applied to the chain by manually depressing valve 52 and simultaneously moving the chain and head 14 relative to each other. This relative movement may be produced by either sliding the applicator head longitudinally along the chain or by moving the chain such as by turning the pedal on a bicycle. With valve 52 depressed, lubricating oil is discharged from passageways 34 in applicator head 14 immediately adjacent the links of chain 16, thereby flushing old oil and particulate contaminants from the chain and particularly the rollers and pivotal connections of the links thereof and wasting less lubricating oil than with conventional lubrication of the chain by discharging oil from the spout of an oil can. The relative movement between chain 16 and applicator head 14 provides a more uniform distribution of oil throughout the length of the chain and assures that all of the pivot connections and roller sleeves thereof are adequately lubricated.

When lubrication of the chain is completed, applicator head 14 is manually removed from the chain and may be swung downwardly to engage the side of lubricator vessel 12 where it will be retained by magnet 28 to prevent the head from accumulating dust and other particulate contaminants therein. Lubricator devices embodying this invention are of simple design and economical manufacture and assembly since they have comparatively few component parts, most of which are readily available as stock items.

We claim:

1. A lubricator for a chain having a plurality of links pivotally interconnected adjacent their ends comprising an applicator head, a guide carried by said head and aligning said head with a chain for relative longitudinal movement therebetween, a magnet carried by said head for retaining said head on a chain in alignment therewith during relative longitudinal movement between said head and a chain, and means forming a passageway carried by said head for a lubricant, said head having a blind chamber therein in communication with said passageway overlying said magnet and having a width exceeding the transverse width of said magnet to define in cooperation therewith at least two passageways for discharging the lubricant onto a chain.

2. A lubricator for a chain having a plurality of links pivotally interconnected adjacent their ends comprising an applicator head, a guide carried by said head and aligning said head with a chain for relative longitudinal movement therebetween, a magnet carried by said head for retaining said head on a chain in alignment therewith during relative longitudinal movement between said head and a chain, and means forming a passageway carried by said head for a lubricant to be discharged onto a chain for lubricating a chain, said magnet being a permanent magnet having a pair of spaced apart longitudinally extending parallel side walls projecting from said head into the space between and lying closely adjacent opposed transversely spaced apart links of a chain when said head is received thereon, thereby providing at least a portion of said guide carried by said head.

3. The lubricator of claim 2 which comprises at least two passageways carried by said head for discharging a lubricant onto a chain, one of said passageways lying closely adjacent one of a pair of opposed links of a chain for discharging a lubricant thereon and the other of said passageways lying closely adjacent the other of the links of said pair of opposed links of a chain for discharging a lubricant thereon.

4. The lubricator of claim 2 wherein said guide extends longitudinally at least substantially continuously for a distance of at least two links of a chain.

5. The lubricator of claim 2 wherein said head has a blind chamber therein overlying said magnet and having a width exceeding the transverse width of said magnet to define in cooperation therewith at least two passageways for discharging the lubricant onto a chain.

6. A lubricator for a steel chain having a plurality of links pivotally interconnected adjacent their ends which comprises an elongate applicator head having a chain contact surface and provided with a lubricant passage extending to said surface, guide means on said head to engage longitudinally extending portions of a chain to guide said head in alignment on a chain during relative longitudinal movement between said head and a chain, a portion of said head adjacent the contact surface having magnetic means to provide a magnetic attraction with steel portions of a chain to hold said head on a chain while lubricant is forced through said lubricant passage.

7. A lubricator as defined in claim 6 in which a lubricant vessel is provided, and means for connecting said vessel with said lubricant passage.

8. The lubricator of claim 6 which also comprises a vessel for a lubricant having a side wall of ferromagnetic material, and a conduit interconnecting said vessel and said lubricant passage of said head for supplying a lubricant from said vessel to said passage of said head, at least a portion of said conduit being flexible such that said head can be releasably retained on said side wall of said vessel by said magnetic means carried by said head.

* * * * *